United States Patent

Gotoh et al.

(10) Patent No.: US 8,567,217 B2
(45) Date of Patent: Oct. 29, 2013

(54) OPTICAL FIBER PREFORM AND MANUFACTURING METHOD THEREFOR

(75) Inventors: Takakazu Gotoh, Sakura (JP); Naritoshi Yamada, Sakura (JP)

(73) Assignee: FUJIKURA Ltd., Tokyo (JP)

( * ) Notice: Subject to any disclaimer, the term of this patent is extended or adjusted under 35 U.S.C. 154(b) by 1817 days.

(21) Appl. No.: 10/838,375

(22) Filed: May 5, 2004

(65) Prior Publication Data

US 2004/0221618 A1     Nov. 11, 2004

(30) Foreign Application Priority Data

| May 9, 2003 | (JP) | P2003-131729 |
| Jul. 7, 2003 | (JP) | P2003-192934 |
| Apr. 2, 2004 | (JP) | P2004-109698 |

(51) Int. Cl.
    *C03B 37/07*      (2006.01)

(52) U.S. Cl.
    USPC ............... 65/382; 65/377; 65/385; 65/415; 65/421; 65/422; 65/426

(58) Field of Classification Search
    USPC ........... 65/377, 382, 385, 415, 421, 422, 426
    See application file for complete search history.

(56) References Cited

U.S. PATENT DOCUMENTS

| 2002/0094180 A1* | 7/2002 | Antos et al. ............... 385/123 |
| 2003/0110811 A1* | 6/2003 | Nunome et al. ............. 65/421 |
| 2003/0140659 A1* | 7/2003 | Fabian ..................... 65/412 |
| 2004/0144134 A1* | 7/2004 | McDonald et al. ........... 65/398 |
| 2005/0092030 A1* | 5/2005 | Balakrishnan et al. ....... 65/421 |

FOREIGN PATENT DOCUMENTS

| EP | 1104891 A1 * | 6/2001 |
| JP | S57-017433 A | 1/1982 |
| JP | 1-203238 A | 8/1989 |
| JP | H06-056448 A | 3/1994 |
| JP | H11-171575 A | 6/1999 |
| JP | 2001-240121 A | 9/2001 |
| JP | 2001-335339 A | 12/2001 |
| JP | 2002-187733 A | 7/2002 |

* cited by examiner

*Primary Examiner* — Queenie Dehghan
(74) *Attorney, Agent, or Firm* — Sughrue Mion, PLLC

(57) ABSTRACT

A method for manufacturing an optical fiber preform includes a process A of applying flame polishing to a center glass rod, a process B of determining a ratio $r_a/r_b$, which is a ratio of a radius $r_a$ of the center glass rod expressed in millimeters with respect to a radius $r_b$ of a target optical fiber preform expressed in millimeters, based on a refractive index profile of a target optical fiber preform, and a process C of determining an amount of fine glass particles to be deposited on the center glass rod so that a ratio $r_a/r_b/c$ falls within a range from 0.002 to 0.01, where "c" is a maximum value of hydroxyl group concentration expressed in ppm in the vicinity of a boundary between the center glass rod and an outer layer, which is formed by depositing fine glass particles on the center rod and by being vitrified.

2 Claims, 2 Drawing Sheets

OPTICAL FIBER PREFORM AND MANUFACTURING METHOD THEREFOR

BACKGROUND OF THE INVENTION

Priority is claimed under 35 U.S.C. §119 to Japanese Patent Application No. 2003-131729, filed May 9, 2003, to Japanese Patent Application No. 2003-192934, filed Jul. 7, 2003, and to Japanese Patent Application No. 2004-109698, filed Apr. 2, 2004, the contents of which are incorporated herein by reference.

FIELD OF THE INVENTION

The present invention relates to optical fiber preforms for making single-mode optical fibers, and also relates to manufacturing methods for such optical fiber preforms. In particular, the present invention relates to an optical fiber preform for making a single-mode optical fiber which allows wavelength division multiplexing transmission over a broad wavelength band, and also relates to a method for manufacturing such an optical fiber preform.

DESCRIPTION OF RELATED ART

In recent years, telecommunication demands have been greatly increased due to rapid popularization of internets and intranets, and higher transmission speed and larger capacity in optical fiber networks are strongly demanded. Under these circumstances, so-called coarse wavelength division multiplexing systems (hereinafter abbreviated as "CWDM systems"), in which optical signals having various wavelengths over an extremely broad wavelength band, e.g., wavelengths from 1.3 µm to 1.6 µm, can be transmitted through an optical fiber, are of interest, and various proposals have been made for CWDM systems.

Conventional single-mode optical fibers cannot be used for CWDM systems due to large transmission loss in a wavelength band around 1.38 µm, which is caused by hydroxyl groups (hereinafter, this transmission loss may be simply referred to as "a transmission loss due to hydroxyl groups"); therefore, a single-mode optical fiber which has extremely small transmission loss due to hydroxyl groups is strongly demanded.

An optical fiber preform for making a single optical fiber or the like is, in general, manufactured through the steps of making a soot preform (which forms a core and a portion of cladding in an optical fiber drawn from the optical preform) using a vapor-phase axial deposition process, dehydrating the soot preform in a chlorine-containing atmosphere, vitrifying the soot preform which has been dehydrated so as to form a center glass rod, drawing the center glass rod so as to have a predetermined radius, depositing fine glass particles on the outer surface of the center glass rod after it has been drawn, and dehydrating and vitrifying the center glass rod having fine glass particles deposited thereon.

In order to reduce transmission loss due to hydroxyl groups, the following three methods have been proposed:
(1) a method in which hydroxyl group concentration in the center glass rod is reduced;
(2) a method in which hydroxyl group concentration in the vicinity of the boundary between the center glass rod and an outer layer that is formed on the outer surface of the center glass rod is reduced; and
(3) a method in which hydroxyl group concentration in the outer layer that is formed on the outer surface of the center glass rod is reduced. These three methods have been employed in combination. Furthermore, various proposals have been made for each of the three methods.

As a method for reducing hydroxyl group concentration in the center glass rod, various proposals have been made, one of which is disclosed in Japanese Unexamined Patent Application, First Publication No. Sho 57-17433. According to the proposed methods, hydroxyl group concentration in the center glass rod can be reduced to below a few ppb (parts per billion).

It is believed that hydroxyl groups are contained in the vicinity of the boundary between the center glass rod and the outer layer that is formed on the outer surface thereof because hydroxyl groups are impregnated into the center glass rod during a drawing process using an oxyhydrogen burner or during a flame polishing process. Accordingly, the methods described below for reducing hydroxyl group concentration in the vicinity of the boundary between the center glass rod and the outer layer that is formed on the outer surface of the center glass rod have been employed.

For example, Japanese Unexamined Patent Application, First Publication No. Hei 11-171575 discloses a method for removing the hydroxyl groups caught on the surface of the center glass rod using plasma etching. Moreover, Japanese Unexamined Patent Application, First Publication No. 2001-240424 discloses a method for removing the hydroxyl groups caught on the surface of the center glass rod using an etching process in which hydrogen fluoride solvent is used. Furthermore, Japanese Unexamined Patent Application, First Publication No. 2002-187733 and Japanese Unexamined Patent Application, First Publication No. 2001-240424 disclose methods in which the center glass rod is drawn in an electric furnace so that the preform on which fine glass particles have not been deposited is not exposed to an oxyhydrogen flame. In addition, Japanese Unexamined Patent Application, First Publication No. 2001-335339 discloses a method in which hydroxyl groups are prevented from being impregnated into a center glass rod by setting the deposition temperature to be low in the vicinity of the outer surface of the center glass rod when fine glass particles are deposited on the outer surface of the center glass rod.

A method similar to the methods for reducing hydroxyl group concentration in the center glass rod may be applied for reducing hydroxyl group concentration in the outer layer that is formed on the outer surface of the center glass rod. In an optical fiber formed from the optical fiber perform including the center glass rod and the outer layer, optical signals do not travel through the outer layer; therefore, some number of hydroxyl groups may remain in the outer layer that is formed on the outer surface of the center glass rod, in contrast to the center glass rod.

The hydroxyl groups, which are contained in the vicinity of the boundary between the center glass rod and the outer layer that is formed on the outer surface of the center glass rod, diffuses into the center glass rod when the optical fiber preform is drawn. If diffused hydroxyl groups reach the region through which optical signals travel, transmission loss due to the hydroxyl groups is increased in the 1.38 µm band.

In order to reduce hydroxyl group concentration in an optical fiber, it is preferable that a ratio of the cross-sectional area occupied by a center glass rod, in which hydroxyl group concentration is reduced to a few ppb or less, to that of the whole optical fiber preform, be increased. However, in this case, because hydroxyl group concentration in the center glass rod must be reduced to be as low as possible, the cost in the dehydrating process for the center glass rod is increased, and thus manufacturing cost of optical fibers is also increased.

In the method for reducing hydroxyl group concentration in the outer layer that is formed on the outer surface of the center glass rod, a problem is encountered in that the number of processes is increased, such as an etching process for removing a portion of the outer layer in which the hydroxyl groups remain.

Furthermore, in the method in which the center glass rod is drawn in an electric furnace, problems may be encountered in that the center glass rod has bubbles or foreign particles therein, unless the preform is subjected to flame polishing prior to an outside deposition process for further fine glass particles.

As explained above, when any of the conventional methods for reducing hydroxyl group concentration in an optical fiber preform are employed, a problem is encountered in that manufacturing cost of the optical fiber preform is increased because the number of processes is increased, or productivity is decreased.

SUMMARY OF THE INVENTION

In view of the above circumstances, objects of the present invention are to provide an optical fiber preform for optical fibers used for CWDM systems and a manufacturing method therefor, and more specifically, objects of the present invention are to provide, at low cost, an optical fiber preform in which hydroxyl group concentration is sufficiently reduced, and which is suitable for making an optical fiber which allows wavelength division multiplexing transmission over a broad wavelength band, and to provide a method for manufacturing such an optical fiber preform.

In order to solve the above objects, the inventors have conducted considerable research in optical fiber preforms and manufacturing method therefor, and finally conceived the present invention by finding the optimum conditions for restraining transmission loss due to hydroxyl groups at a sufficiently low level with regard to a ratio of the cross-sectional area occupied by a center glass rod to that of the entire optical fiber preform, and with regard to maximum hydroxyl group concentration at the boundary between the center glass rod and an outer layer that is formed on the outer surface of the center glass rod.

In order to achieve the above objects, the present invention provides an optical fiber preform including a center glass rod having a radius of $r_a$ expressed in millimeters; and an outer layer surrounding the center glass rod and having an outer radius of $r_b$ expressed in millimeters measured from a center axis of the center glass rod, wherein the radiuses $r_a$ and $r_b$ satisfy the following inequalities: $0.002 < r_a/r_b/c < 0.01$, where "c" expressed in ppm is a maximum value of hydroxyl group concentration in the vicinity of a boundary between the center glass rod and the outer layer.

The present invention further provides a method for manufacturing an optical fiber preform including a process A of applying flame polishing to a center glass rod; a process B of determining a ratio $r_a/r_b$, which is a ratio of a radius $r_a$ of the center glass rod expressed in millimeters with respect to a radius $r_b$ of a target optical fiber preform expressed in millimeters, based on a refractive index profile of a target optical fiber preform; and a process C of determining an amount of fine glass particles to be deposited on the center glass rod so that a ratio $r_a/r_b/c$ falls within a range from 0.002 to 0.01, where the ratio $r_a/r_b$ is calculated in the process B, and "c" is a maximum value of hydroxyl group concentration expressed in ppm in the vicinity of a boundary between the center glass rod and an outer layer, which is formed, after the process A, by depositing fine glass particles on the center rod and by being vitrified.

In the optical fiber preform according to the present invention, hydroxyl group concentration is at a practically low level in the center glass rod and in the outer layer that is formed on the outer surface of the center glass rod; therefore, the transmission loss in the 1.38 μm band due to the hydroxyl group is maintained at a sufficiently low level in the optical fibers obtained by drawing the optical fiber preform. Accordingly, the optical fibers, which are manufactured from the optical fiber preforms of the present invention, allow wavelength division multiplexing transmission over a broad wavelength band.

According to the method of the invention for manufacturing an optical fiber preform, an optical fiber preform can be manufactured at low cost, the optical fiber preform being suitable for making optical fibers in which hydroxyl group concentration is sufficiently reduced, and which allow wavelength division multiplexing transmission over a broad wavelength band.

DETAILED DESCRIPTION OF THE INVENTION

The present invention will be explained in detail below.

Figure 1:
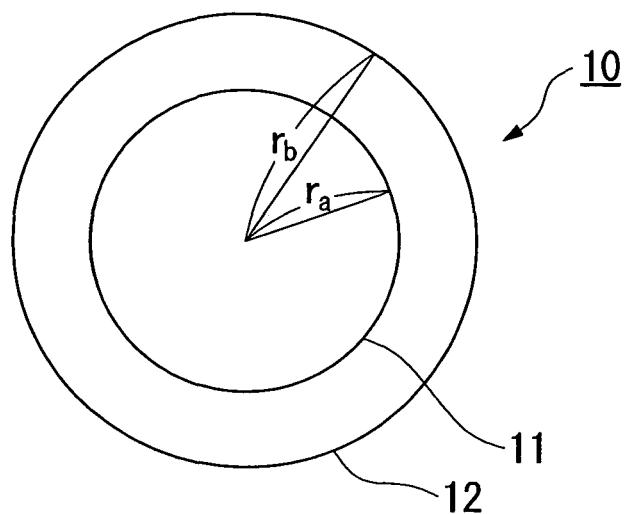
FIG. 1 is a schematic cross-sectional view showing an example of optical fiber preforms according to the present invention.

FIG. 1 is a schematic cross-sectional view showing embodiments of optical fiber preforms according to the present invention.

An optical fiber preform 10 in this embodiment is formed in a cylindrical shape, and includes a center glass rod 11, and an outer layer 12 which is formed by dehydrating and vitrifying fine glass particles having silica glass as the main constituent and deposited on the outer surface of the center glass rod 11. The center portion of the center glass rod 11, which is to form a core of an optical fiber, is made of glass having silica glass as the main constituent as well as a dopant such as germanium dioxide ($GeO_2$) and the like.

In FIG. 1, $r_a$ indicates the radius of the center glass rod, and $r_b$ indicates the radius of the optical fiber preform.

Figure 2:
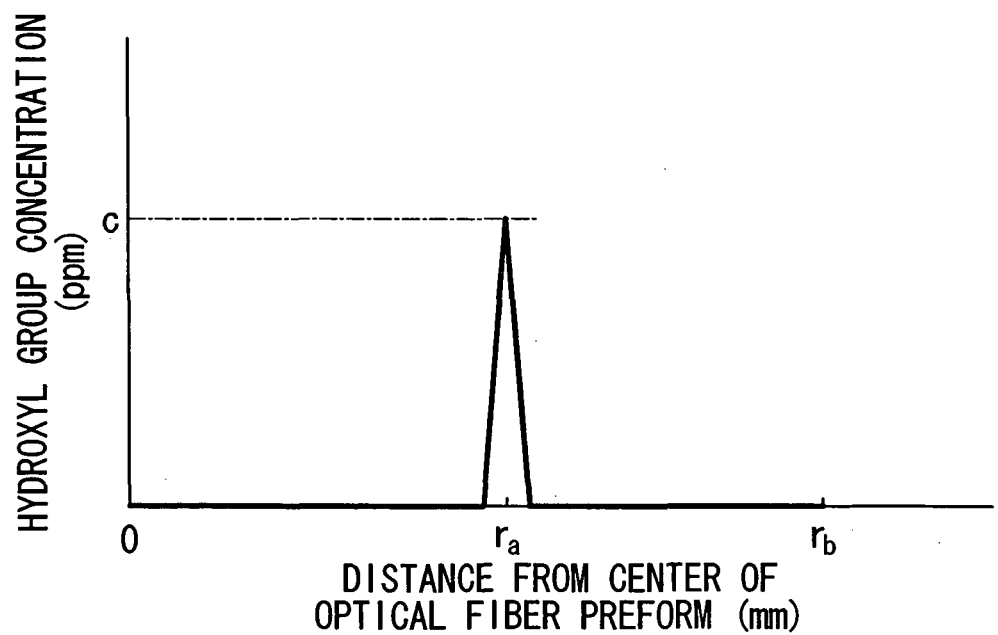
FIG. 2 is a diagram schematically showing hydroxyl group concentration along the radial direction of an optical fiber preform.

FIG. 2 is a diagram schematically showing hydroxyl group concentration along the radial direction of an optical fiber preform shown in FIG. 1. In the present invention, hydroxyl group concentration along the radial direction of an optical fiber preform is measured using a microscopic Fourier transform infrared spectrophotometer (a microscopic FT-IR).

As shown in FIG. 2, hydroxyl group concentration steeply increases at a distance of $r_a$ mm (millimeters), which is measured from the center of the optical fiber preform, and the maximum value of hydroxyl group concentration at this point is "c" ppm (parts per million).

The hydroxyl group concentration exhibits the maximum value of "c" at a distance of $r_a$ mm, which is measured from the center of the optical fiber preform, where $r_a$ mm substantially coincides with the radius of the center glass rod because, during the processes for manufacturing an optical fiber preform, hydroxyl groups are contained in the vicinity of the surface of the center glass rod at a high concentration during a flame polishing process, which is applied for removing foreign particles from the surface of the center glass rod, and for smoothing scratches thereon, before depositing fine glass particles on the surface of the center glass rod.

In this embodiment, in the optical fiber preform 10, when the radius of the center glass rod 11 is designated as $r_a$ mm (millimeters), the radius of the optical fiber preform 10 is designated as $r_b$ mm, and a maximum hydroxyl group concentration at a position having the distance from the center of the optical fiber preform 10 of $r_a$ mm (millimeters), i.e., a maximum hydroxyl group concentration in the vicinity of the boundary between the center glass rod 11 and the outer layer 12, is designated as "c" ppm (parts per million), a ratio $r_a/r_b/c$ satisfies the following inequalities:

$$0.002 < r_a/r_b/c < 0.01.$$

If the ratio $r_a/r_b/c$ is less than or equal to 0.002, the hydroxyl group, which is contained in the vicinity of the boundary between the center glass rod 11 and the outer layer 12, diffuses into the center glass rod 11 during a drawing process for making an optical fiber, and the hydroxyl groups reach the region through which optical signals travel so that the transmission loss in the 1.38 μm band due to the hydroxyl group is increased.

On the other hand, if the ratio $r_a/r_b/c$ is greater than or equal to 0.01, the number of processes must be increased compared with the case in which the ratio $r_a/r_b/c$ satisfies the inequalities $0.002 < r_a/r_b/c < 0.01$, which leads to an increase in manufacturing cost. In addition, the fraction of defective manufactured optical fiber preforms may be increased, and the manufacturing cost of optical fibers may be increased, which are undesirable. However, if the ratio $r_a/r_b/c$ is equal to 0.01, increase in the transmission loss due to the hydroxyl groups contained in the vicinity of the boundary between the center glass rod and the outer layer is substantially 0 dB/km; therefore, the transmission loss due to the hydroxyl groups will not increase if the ratio $r_a/r_b/c$ is greater than or equal to 0.01.

The ratio $r_a/r_b$, i.e., the ratio of the radius $r_a$ (mm) of the center glass rod to the radius $r_b$ (mm) of the optical fiber preform, indicates a location at which hydroxyl groups are contained in the optical fiber preform at a high concentration.

The hydroxyl groups contained in the optical fiber preform diffuse into the optical fiber during a drawing process. When the ratio $r_a/r_b$ is low, the hydroxyl groups diffuse to the region through which light signals are transmitted, and thus the transmission loss due to hydroxyl groups is increased. Accordingly, it is desirable that the ratio $r_a/r_b$ be greater. On the other hand, the hydroxyl group concentration in the center glass rod must be maintained to as low as less than a few ppb in order to avoid an increase in the transmission loss due to hydroxyl groups. Accordingly, the flow rate of the dehydrating agent and the time for dehydrating must be increased during the dehydrating process for the center glass rod. As a result, manufacturing cost for optical fiber preforms will increase.

As a method for reducing the concentration of the hydroxyl groups contained in the vicinity of the boundary between the center glass rod and the outer layer, a flame polishing process, which is generally used for removing foreign particles remaining on the surface of the center glass rod and for smoothing scratches on the surface of the center glass rod, is applied while the surface temperature of the center glass rod is controlled to be relatively low by reducing the flow rate of oxygen and hydrogen. In this case, the hydroxyl group concentration in the center glass rod can be reduced; however, the foreign particles cannot be completely removed and the scratches cannot be completely smoothed. As a result, defects, such as bubbles, foreign particles, or scratches, remain in the inner portion of the optical fiber preform. Optical fibers, which are obtained by drawing the optical fiber preform containing such defects therein, cannot be used for an optical transmission path. Accordingly, the yield of optical fiber preforms may be decreased, which may lead to an increase in manufacturing cost of optical fibers.

As a method for reducing the concentration of the hydroxyl groups contained in the vicinity of the boundary between the center glass rod and the outer layer, a plasma etching process may be employed; however, when a plasma etching process is employed, the number of processes is increased; therefore, the manufacturing cost of optical fibers is increased.

As explained above, when the inequalities $0.002 < r_a/r_b/c < 0.01$ are satisfied in the optical fiber preform 10, an increase in transmission loss due to hydroxyl groups can be avoided in the optical fibers which are made by drawing the optical fiber preform 10, and also an increase in manufacturing cost can be avoided.

The transmission loss may change depending on the drawing conditions because the hydroxyl groups contained in the vicinity of the boundary between the center glass rod and the outer layer diffuse into the optical fiber during a drawing process. However, the effects of the drawing conditions are generally less significant when compared with the effects of the ratio $r_a/r_b$ and the maximum value "c". Therefore, the transmission loss due to hydroxyl groups can be reduced when the inequalities $0.002 < r_a/r_b/c < 0.01$ are satisfied, provided that the drawing speed is controlled within a range from 500 m/min to 2000 m/min.

A method for manufacturing an optical fiber preform according to the above embodiment will be explained below.

As a first step in the method for manufacturing an optical fiber preform according to the above embodiment, a starting glass element, i.e. a starting rod, is held and rotated about the center axis thereof.

Next, using a burner for synthesizing glass (not shown), first fine glass particles are synthesized in a hydrolysis reaction or in an oxidizing reaction progressed in the flame of the burner for synthesizing glass, and the first fine glass particles are deposited on the glass element while the glass element is rotated and moved vertically and upwardly, so that a soot preform is formed.

Next, the soot preform is moved through a helium atmosphere containing chlorine gas in an electric furnace in which temperature is adjusted to approximately 1200° C. so that the soot preform is dehydrated, and then the soot preform is moved through another region in the electric furnace in which temperature is adjusted to approximately 1500° C. so that the soot preform is vitrified so as to obtain a center glass rod 11.

Next, while the center glass rod 11 is heated and melted in the electric furnace, the center glass rod 11 is drawn until the radius thereof reaches $r_a$.

Next, a flame polishing process using an oxyhydrogen flame is applied to the center glass rod 11 so that the surface temperature thereof exceeds 1800° C. (Process A).

In addition, the ratio $r_a/r_b$, i.e., the ratio of the radius $r_a$ (mm) of the center glass rod to the radius $r_b$ (mm) of the desired optical fiber preform, is calculated based on the refractive index profile of the desired optical fiber preform (Process B).

Next, the center glass rod 11 is held and rotated about the center axis thereof.

Next, fine glass particles are synthesized using the burner for synthesizing glass, and the fine glass particles are deposited on the center glass rod 11 in the radial direction thereof while the burner for synthesizing glass is moved in the longitudinal direction of the center glass rod 11.

In this process, the amount of fine glass particles to be deposited on the center glass rod 11 is determined (Process C) such that the ratio $r_a/r_b/c$ falls within a range from 0.002 to 0.01, where "c" (ppm) is the maximum concentration of the hydroxyl groups contained in the vicinity of the boundary between the center glass rod 11 that is vitrified in the latter process and the outer layer, and the ratio $r_a/r_b$ is obtained in Process B.

Next, the center glass rod 11 is moved through a helium atmosphere containing chlorine gas in the electric furnace in which temperature is adjusted to approximately 1200° C. so that the center glass rod 11 is dehydrated, and then the center glass rod 11 is moved through another region in the electric furnace in which temperature is adjusted to approximately 1500° C. so that the center glass rod 11 is vitrified so as to form an outer layer 12 and so as to obtain an optical fiber preform 10 having a radius of $r_b$ (mm).

In the method of the present invention for manufacturing an optical fiber preform, a flame polishing process using an oxyhydrogen flame is applied to the center glass rod 11 so that the surface temperature thereof exceeds 1800° C. When the temperature of the oxyhydrogen flame is below 1800° C., the effect of flame polishing cannot be sufficiently obtained.

Here, the flame polishing process is explained.

The flame polishing process is a polishing process in which a portion of the surface of glass is polished by increasing the surface temperature of glass by applying a flame thereto so that $SiO_2$ is vaporized from the surface of the glass. An oxyhydrogen flame is, in general, used in a flame polishing process because, by using an oxyhydrogen flame, it is easy to obtain a high temperature condition, and extra reaction products may not be produced.

When, for example, there are scratches and bubbles having a depth of 0.05 mm on the surface of glass, these scratches and bubbles can be removed from the surface of the glass by polishing the surface by an amount of 0.1 mm using a flame polishing. Moreover, when foreign particles are embedded in the surface, the foreign particles will vaporized with glass by applying a flame polishing to the surface of glass.

Moreover, the maximum hydroxyl group concentration "c" in the vicinity of the boundary between the center glass rod 11 and the outer layer 12 can be reduced by applying a plasma etching process to the surface of the center glass rod 11, or by decreasing the temperature at which the surface polishing is performed after the drawing process is applied to the center glass rod 11 in the electric furnace (more specifically, by reducing amounts of oxygen gas and hydrogen gas). However, if the surface temperature of the center glass rod 11 is decreased excessively, polishing may be ineffective, and the yield of the optical fiber preform may be reduced due to defects on the surface of the center glass rod 11 or foreign particles.

According to the above method for manufacturing an optical fiber preform, the optical fiber preform 10 can be manufactured so that the radius $r_a$ (mm) of the center glass rod 11, the radius $r_b$ (mm) of the optical fiber preform 10, and the maximum hydroxyl group concentration "c" (ppm) in the vicinity of the boundary between the center glass rod 11 and the outer layer 12 satisfy the inequalities $0.002 < r_a/r_b/c < 0.01$. When the radius $r_a$ (mm) of the center glass rod 11, the radius $r_b$ (mm) of the optical fiber preform 10, and the maximum hydroxyl group concentration "c" (ppm) in the vicinity of the boundary between the center glass rod 11 and the outer layer 12 satisfy the inequalities $0.002 < r_a/r_b/c < 0.01$, the optical fiber preform 10, from which optical fibers with sufficiently low transmission loss in the 1.38 μm band due to hydroxyl groups are obtained, can be manufactured without increasing manufacturing cost.

The relationship between the maximum hydroxyl group concentration "c" (ppm) and the conditions of the flame polishing process can be experimentally determined.

The present invention will be more specifically explained below with reference to various Examples.

Example 1

A glass rod including a core and a portion of cladding was formed using a VAD (Vapor-phase Axial Deposition) method, and the glass rod is drawn so as to have a diameter of 23 to 34 mm to obtain a center glass rod.

Then, plural center glass rods were obtained by applying similar processes.

A flame polishing process, in which an oxyhydrogen flame was ejected from a burner moving along the longitudinal direction of each of the glass rods, was applied to the surface of each of the center glass rods.

The moving rate of the burner was set to be 30 mm/min.

As shown in TABLE 1, the temperature of the oxyhydrogen flame, flow rate of oxygen supplied to the burner, and flow rate of hydrogen supplied to the burner were variably set (Conditions A to E).

Next, fine glass particles were deposited on the outer surface of each of the center glass rods, and each of the center glass rods having the deposited fine glass particles was dehydrated and vitrified in an electric furnace so as to form an outer layer, so that optical fiber preforms having a cylindrical shape were obtained.

The obtained optical fiber preforms were cut in a direction perpendicular to the longitudinal direction so as to obtain glass plates having a thickness of 1 mm.

Samples for measuring hydroxyl group concentration were made by polishing the glass plates until mirror surfaces were obtained for each of the glass plates.

Hydroxyl group concentration was measured using a microscopic FT-IR from the center of each of the samples for measuring hydroxyl group concentration at every 30 μm in the radial direction. As a result, a distribution of hydroxyl group concentration shown in FIG. 2 was obtained.

Based on the distribution of hydroxyl group concentration, the maximum value "c" (ppm) of hydroxyl group concentration in the vicinity of the boundary between the center glass rod and the outer layer was obtained. The results are shown in TABLE 1.

When the flow rates of oxygen and hydrogen were set to be greater, the temperature of the flame, i.e., the surface temperature of the center glass rod was increased, and a greater number of hydroxyl groups migrated into the center glass rod.

In addition, bubbles on the surface of the center glass rod and other defects (scratches and foreign particles on the surface of the center glass rod) were visually counted while emitting light into the center glass rod from an end of thereof using a halogen lamp. The number of bubbles and other defects was counted in a center glass rod having a length of 100 mm.

TABLE 1

|  | Flow rate of oxygen (L/min) | Flow rate of hydrogen (L/min) | Moving rate of burner (mm/min) | Maximum hydroxyl group concentration c (ppm) | Temperature of flame (° C.) | Number of bubbles and other defects |
|---|---|---|---|---|---|---|
| Condition A | 230 | 115 | 30 | 130 | 1940 | 0 |
| Condition B | 260 | 130 | 30 | 180 | 2050 | 0 |
| Condition C | 110 | 55 | 30 | 50 | 1780 | 4 |
| Condition D | 90 | 45 | 30 | 35 | 1690 | 12 |
| Condition E | 70 | 35 | 30 | 20 | 1550 | numerous |

As shown in TABLE 1, when the flow rates of oxygen and hydrogen were set to be lower, the maximum value "c" (ppm) of hydroxyl group concentration in the vicinity of the boundary between the center glass rod and the outer layer was decreased, and on the other hand, the number of bubbles and other defects was increased. Specifically, under Condition E, the number of bubbles and other defects was significantly increased, and the yield of optical fiber preform was significantly decreased.

Example 2

A glass rod including a core and a portion of cladding was formed using a VAD method, and the glass rod is drawn so as to have a diameter of 23 to 34 mm to obtain a center glass rod.

Using the above center glass rod, in a manner similar to Example 1, optical fiber preforms having a cylindrical shape were obtained under Conditions A-1 to A-3, and B-1 to B-3 shown in TABLE 2. In TABLE 2, $r_a$ indicates the radius of the center glass rod, and $r_b$ indicates the radius of the optical fiber preform.

TABLE 2

|  | Maximum hydroxyl group concentration c (ppm) | $r_a/r_b$ | $r_a/r_b/c$ |
|---|---|---|---|
| Condition A-1 | 130 | 0.248 | 0.0019 |
| Condition A-2 | 130 | 0.352 | 0.0027 |
| Condition A-3 | 130 | 0.416 | 0.0032 |
| Condition B-1 | 180 | 0.320 | 0.0018 |
| Condition B-2 | 180 | 0.368 | 0.0020 |
| Condition B-3 | 180 | 0.496 | 0.0028 |

Optical fibers were formed by drawing the optical fiber preforms fabricated under the conditions shown in TABLE 2. The drawing speed was set at 1000 m/min.

The transmission losses in the 1.38 μm band due to hydroxyl groups in the optical fibers were measured. The measured results are shown in FIG. 3.

Figure 3:
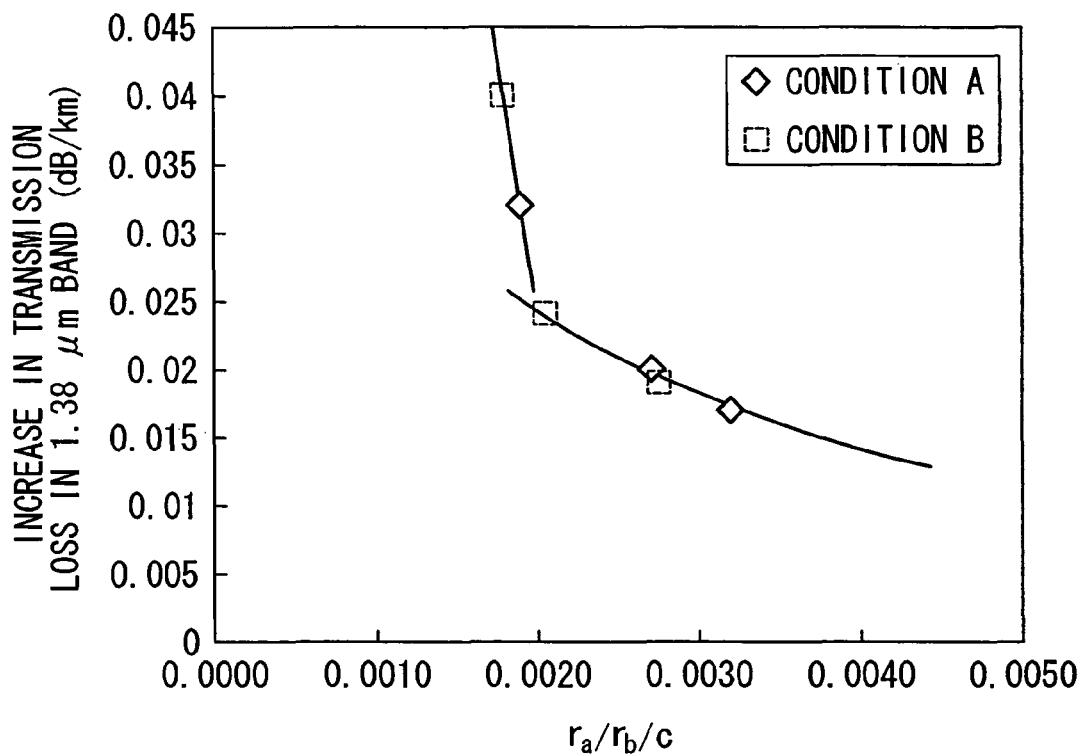
FIG. 3 is a graph showing the relationship between a ratio $r_a/r_b/c$ and an increase in transmission loss due to hydroxyl groups in the 1.38 μm band, in Example 2.

As shown in FIG. 3, the transmission loss due to hydroxyl groups significantly increased when the ratio of $r_a/r_b/c$ was less than 0.002.

Example 3

In a manner similar to Example 2, center glass rods were made, and using these center glass rods, optical fiber preforms having a cylindrical shape were obtained under Conditions C, D-1, D-2, and E shown in TABLE 3.

TABLE 3

|  | Maximum hydroxyl group concentration c (ppm) | $r_a/r_b$ | $r_a/r_b/c$ |
|---|---|---|---|
| Condition C | 50 | 0.288 | 0.006 |
| Condition D-1 | 32 | 0.288 | 0.009 |
| Condition D-2 | 35 | 0.416 | 0.012 |
| Condition E | 20 | 0.288 | 0.014 |

Optical fibers were formed by drawing the optical fiber preforms fabricated under the conditions shown in TABLE 3. The drawing speed was set at 1000 m/min.

The transmission losses in the 1.38 μm band due to hydroxyl groups in the optical fibers were measured. The measured results are shown in FIG. 4.

Figure 4:
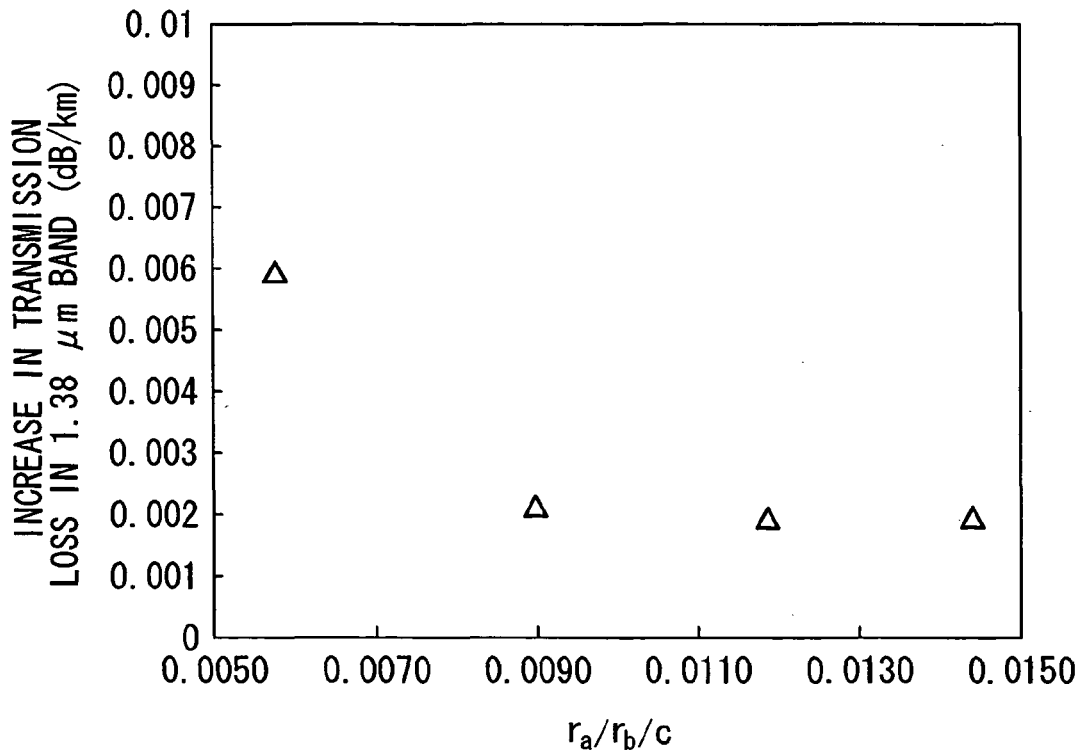
FIG. 4 is a graph showing the relationship between a ratio $r_a/r_b/c$ and an increase in transmission loss due to hydroxyl groups in the 1.38 μm band, in Example 3.

As shown in FIG. 4, the transmission loss due to hydroxyl groups cannot be reduced even when the ratio of $r_a/r_b/c$ was set to be greater than 0.01. Accordingly, when the ratio of $r_a/r_b/c$ was set to be greater than 0.01, only manufacturing cost was increased.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

The present invention can be applicable to any optical fiber preforms and any manufacturing methods therefor which include a step of making a center glass rod including a core and a portion of a cladding, and a consequent step of depositing a cladding on the outer surface of the center glass rod.

The center glass rod may be formed using a CVD method or an OVD method, not necessarily using the VAD method.

The cladding may be added to the center glass rod by inserting a center glass rod into a silica tube having a small amount of hydroxyl groups, and then by heating the same for integration, not using the method described above in which a vitrifying process is applied after depositing fine glass particles on a center glass rod.

What is claimed is:
1. An optical fiber preform comprising:
a center glass rod having a radius of $r_a$ expressed in millimeters, and including a core portion and a first portion of a cladding; and
an outer layer, which is a second portion of the cladding, surrounding the center glass rod and having an outer radius of $r_b$ expressed in millimeters measured from a center axis of the center glass rod,
wherein the radiuses $r_a$ and $r_b$ satisfy the following inequalities:

$$0.002 < (r_a/r_b)/c < 0.01,$$

where "c" expressed in ppm is a maximum value of hydroxyl group concentration in the vicinity of a boundary between the center glass rod and the outer layer; and wherein a hydroxyl group concentration in the outer layer decreases with distance from the boundary between the center glass rod and the outer layer, and does not increase between the boundary between the center glass rod and the outer layer and the outer radius of the outer layer.

2. An optical fiber preform according to claim 1, wherein there is no hydroxyl group concentration in an outer area of the outer layer.

* * * * *